Jan. 13, 1953   L. FERLISE   2,625,080
MOUNTING CLIP FOR MIRRORS AND THE LIKE
Filed Aug. 3, 1950

INVENTOR.
Louis Ferlise
BY
Wood, Arey, Henn & Evans
ATTORNEYS.

Patented Jan. 13, 1953

2,625,080

UNITED STATES PATENT OFFICE 2,625,080

MOUNTING CLIP FOR MIRRORS AND THE LIKE

Louis Ferlise, Middletown, Ohio, assignor to The Philip Carey Manufacturing Company, Lockland, Ohio, a corporation of Ohio Application August 3, 1950, Serial No. 177,444

7 Claims. (Cl. 88—96)

This invention relates to a detachable clip for mounting mirrors and similar panels upon a backing or support therefor and is intended particularly for mounting safely and in a simple manner, a mirror upon the sheet metal door of a wall cabinet such as the standard houshold medicine chest.

Cabinets such as these typically are provided with doors consisting of a sheet metal panel bounded by side flanges which include lateral face flanges bent inwardly and overlying the sheet metal panel. The metal panel forms the inner surface of the door, the side flanges rigidify the door and provide the necessary thickness and the face flanges provide a seat engageable with the marginal edges of the mirror to sustain it at spaced relationship from the inside panel. The mirror lies over the door face, with its surface exposed in a clean attractive manner.

It has been the practice to secure the mirror of such a cabinet in position upon its support flanges by means of metal clips which overlie the edge of the mirror and have their body portions secured to the sheet metal frame. The clips customarily are applied at spaced intervals along the mirror edges and exert a pressure against the edges of the mirror to clamp it against the seat flange. A metal-to-glass connection of this nature requires very careful fitting because the connection must not be tight enough to strain and possible break the glass, and on the other hand, it must not be loose enough to allow the glass to rattle when the door is opened and closed.

One of the primary objects of the invention has been to provide a clip of simple one-piece construction adapted to be inserted laterally into openings formed in the edges of the cabinet door and capable of locking itself securely to the door and arranged to exert a yieldable clamping pressure upon the edge of the mirror to hold it against the seat flange. The yieldable clamping pressure exerted by the clips is sufficient to restrain the mirror against undersirable looseness and rattle, yet it is not sufficient to produce localized strain which may lead to breakage of the glass if the door inadvertently is slammed shut.

A further object of the invention has been to provide a simple clip which is substantially concealed when in operative position, so that the clean face of the whole of the mirror remains unobstructed to retain its attractive appearance.

A still further objective has been to provide a clip unit which, in conjunction with the cabinet door, is of self locking, self sustaining nature but which may be removed conveniently in the event the mirror which it holds becomes broken or must be replaced.

The improved clip, briefly, consists of a one piece unit, fabricated of spring metal, constituting a yieldable clamp having one portion adapted to engage the mirror face, a second portion adapted for interlocking engagement with the mirror backing or door frame of the cabinet and a third portion, residing intermediate the other two, adapted to engage the facial flange of the miror backing or cabinet door and thereby exert a yielding clamping pressure to draw the mirror engaging portion toward the backing upon which the mirror is to be mounted. Interlocking engagement of the clip with the cabinet door is completed upon insertion of the clip into the aperture intended to receive it and, under the yielding pressure exerted by the intermediate portion of the clip, interlocking engagement is maintained to prevent inadvertent detachment of the clip from the assembly. However, by the insertion of a tool or instrument between the edge of the aperture and the clip, the clip may be sprung to permit easy removal thereof from interlocking engagement with the cabinet door, and it may then be withdrawn from the aperture, as may be necessary if the mirror becomes broken or defaced.

When a number of such clips are applied at spaced points along the edge of the mirror, the clips by virtue of their yieldability, naturally eliminate variations in pressure engagement against the glass; consequently the glass is gripped under substantially uniform pressure by the collective clips to prevent the formation of localized strains due to warpage of the sheet metal door or other cause. This is an important feature of the invention because the thickness of commercial mirror glass, whether bevelled or not, varies unless special precautions are taken at commensurately greater expense to hold the dimensions to precise tolerances. The clips of the present invention are adapted to be used either with plain edge glass or bevelled edge glass, clips for usage with the latter differing in construction from those for the former only in respect to the angles at which the mirror engaging portions of the clips are formed.

In its preferred construction, the cabinet or mirror backing door is provided with a metal lip across its lower or bottom edge extending beyond the face flanges and providing a seat upon which the mirror panel is rested. Thus the major weight load is supported upon the lip while the mounting clips hold the panel firmly clamped in mounted position. The apertures which anchor the clips may be stamped or blanked out at very small cost during the stamping and forming of the sheet metal door unit, and the clips, after insertion, cover the apertures, thus presenting a neat, trim appearance. The clips are installed in a rapid, convenient manner simply by pressing them into the apertures by hand or with a simple pressure tool.

In the preferred construction, a pair of diverging yieldable limbs are bent generally in the form of a wedge, and a connector or shank portion is bent laterally from the lower limb, at the diverging end of the wedge, so as to reside in contact with the side flange of the cabinet door. The free end of the shank portion includes an ear adapted to overlie the edge of the mirror and draw it firmly into clamping engagement against the seat flange of the cabinet door or backing. The aperture to receive the clip, located in the side flange of the cabinet door or backing, is slightly smaller in height than the trailing end of the wedge defined by the yieldable limbs, thus causing the limbs to be compressed toward one another as they are pressed into it. For interlocking connection, the lower limb is provided with slots adapted to snap into or straddle lugs respectively formed in the edge of the aperture when the limbs are fully inserted. Thus, the limbs may expand slightly when the slots register with and slip over the edges of the lugs, to lock the clip in a positive manner against withdrawal from its aperture. In this manner, the yieldable limbs develop a yieldable force, effecting pressure engagement of the clip ear against the mirror face and additionally provide an automatic snap engagement of the limb with respect to the aperture. The clip is capable of being removed by springing upwardly the lower limb, which engages the lugs of the aperture, then withdrawing the clip outwardly from the aperture. Such removal can be accomplished by inserting a screw driver, ice pick, or similar tool between the lower limb and edge of the aperture which may be recessed slightly for this purpose.

The clips are exceedingly simple and economical to manufacture and may be fabricated from resilient metal such as spring steel, spring brass or the like by stamping and bending. In order to provide an attractive appearance, the clips are preferably plated and buffed to impart a bright surface finish to them, corresponding in appearance to the mirror silvering. Various sizes of mirrors may be mounted by use of the clips, the larger sizes being accommodated by the provision of anchorage apertures spaced according to the size and weight of the mirror to be mounted.

Various features and advantages of the invention will be more fully disclosed in the following detailed description taken in connection with the drawings.

Figure 1:
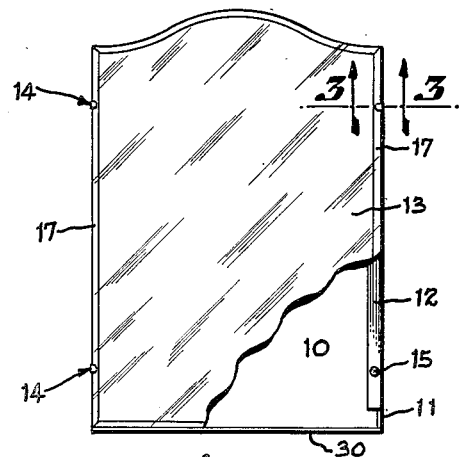
Figure 1 is a face view of a wall cabinet door, showing generally the arrangement of the mounting clips relative to a mirror, a portion of the mirror being broken away to illustrate the face flange and cushion pad against which the marginal edge of the mirror is clamped.

Described generally with reference to Figure 1, illustrating a typical wall cabinet door installation, the backing for the mirror is formed of sheet metal constituting a rectangular panel 10 having a pair of marginal side flanges 11 which delineate the thickness of the door. The outer edges of side flanges 11 are provided with in-turned marginal face flanges 12 against which the mirror panel 13 is clamped by the clips indicated generally at 14. In order to cushion the mirror, there is provided a series of cushion pads 15 which are formed preferably of felt, these pads being interposed between the face flange 12 and mirror 13. In the present example, the mirror is mounted by four clamps, two on each side and a cushion pad 15 is applied adhesively to the flange in a position adjacent the respective mounting clips. Although shown and described in its application to a mirror, the present invention contemplates utilization of the improved clips generally in the mounting of panels which require safe and reliable attachment to a sheet metal frame back or other structure.

Figure 2:
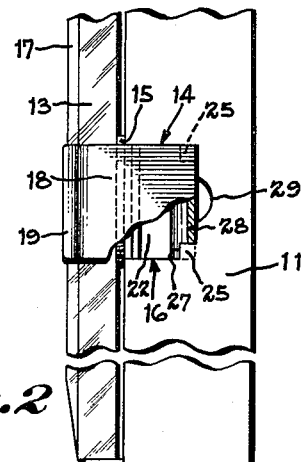
Figure 2 is an enlarged fragmentary side elevation of the lower portion of the door, illustrating a clip anchored in its aperture and in clamping engagement against the marginal edge of the mirror, and showing the lip at the lower edge of the mirror backing for supporting the lower edge of the mirror.
Figures 3, 4:
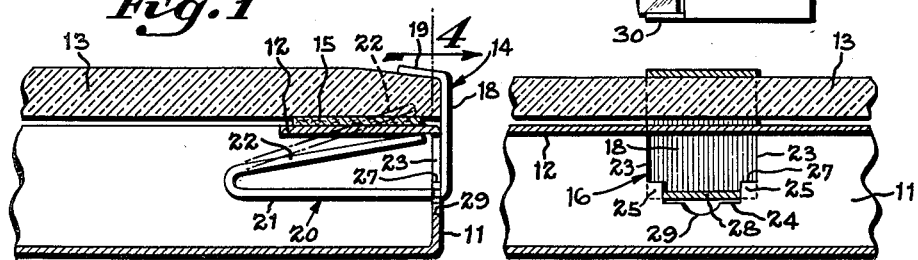
Figure 3 is an enlarged fragmentary sectional view taken on line 3—3, Figure 1, detailing the mounting clip structure and its pressure engagement within the door flange, the normal unstressed position of the yieldable limb being indicated in broken lines.
Figure 4 is a sectional view taken on line 4—4, Figure 3, further detailing the clip, particularly its locking engagement with the lugs of the door flange aperture.

As shown in Figures 2 and 4, the side flange 11 of the door is provided with a series of apertures 16, one for each clip. Each aperture extends from the marginal face flange 12 approximately to the center line of the side flange. Each aperture is slightly greater in width than the clip 14, to permit the clip to be inserted freely within the aperture widthwise, while the height or depth of the aperture is less than the distance between the yieldable diverging limbs to produce a snap engagement when the clip is fully inserted. In final position as described at a later point, the clip locks itself positively in the aperture in position to engage the beveled edge 17 of the mirror under pressure.

Described in detail, the clip 14 consists of a connector portion 18 adapted to reside along the side flange 11 of the mirror backing and 18 includes upon its outer end an ear 19 which projects laterally and overlies the beveled edge 17 of the mirror. The opposite end of connector portion 18 is provided with a wedge shaped anchorage section generally indicated at 20 which consists of a pair of diverging yieldable limbs 21 and 22, the lower limb being bent laterally to the facial portion 18; and the limb 22 being bent reversely from the end of the limb 21. The two limbs normally diverge from one another, as indicated by the broken lines shown in Figure 3, so that there is a pressure engagement by the upper limb 22 against the undersurface of the marginal face flange 12 when the clip is locked in its final position.

The clip is formed of yieldable metal and may be fabricated by a stamping and bending operation, while the cooperating apertures 16 of side flanges 11 also may be formed by a simple stamping operation as a step in the fabrication of the sheet metal backing portion of the door unit.

Figures 7, 8, 9:
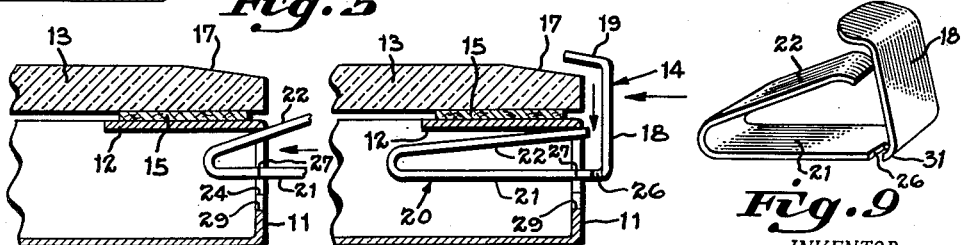
Figure 7 is a fragmentary cross sectional view similar to Figure 3 illustrating the locking aperture of the mirror backing prior to insertion of the mounting clip therein.
Figure 8 is a view similar to Figure 7 showing the progressive compression of the diverging flexible limbs during insertion of the clip but prior to the final engagement of the locking slots with the aperture lugs.
Figure 9 is a view similar to Fig. 5 showing a modified form of clip adapted to be used in the same manner as the clip of Figure 5 but having additional advantages.

As shown in Figures 4 and 7, the clip receiving aperture 16 consists of spaced parallel side edges 23—23 joined along edge 24. At the juncture of the side edges 23 and edge 24, the aperture is configurated to provide a pair of locking lugs or tabs 25—25 which serve as keys engageable with the locking slots 26—26 formed in the lower limb 21 at the juncture between the limb and facial portion 18. Each clip of course may be retained by only one key instead of the two shown if desired.

Figure 5:
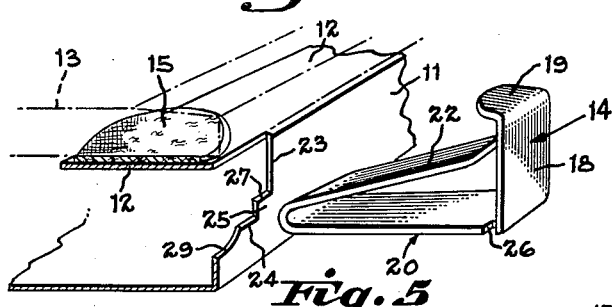
Figure 5 is a fragmentary perspective view of a portion of the cabinet or mirror backing door, illustrating the mode of applying the mounting clip to the aperture in a side flange thereof.
Figure 6:
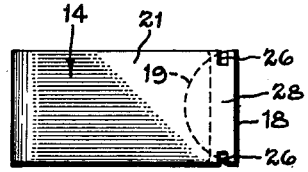
Figure 6 is a bottom plan view of the mounting clip illustrating particularly the slots for locking the clip in its aperture.

The insertion of the clip is best disclosed in Figures 5, 7 and 8. As disclosed in Figure 8, the side edges of limb 21 slide upon the upper surfaces 27 of the keys 25, as the limbs 21, 22 are pushed through the opening, the upper limb being pressed against the underneath surface of marginal flange 12. The pressure exerted by the limbs 21 and 22, due to their divergence, increases progressively as they are compressed toward one another during their longitudinal movement into the aperture facilitating easy introduction of the clip into its aperture. When the locking slots 26—26 are in alignment with the locking keys 25—25 the lower limb snaps down to engage the keys with the slots. It is to be noted that the parts are so dimensioned that when the ear 19 resides in final position against the face of a mirror, edge 24 will be spaced slightly from the limb 21, thereby causing the ear 19 to bear against the mirror face under the pressure provided by limb 22. Thus the clearance distance enables mirror glasses of varying thickness within commercial limits to be tolerated without sacrificing security in the connection of the mirror to its backing. It will also be noted that the metal section 28 between the slots 26—26 is substantially equal to the spacing between the locking keys (Figures 4 and 6), such that upon registering with the keys, the notches interfit the keys. The keys therefor establish a positive locking engagement with the notches and at the same time the clamping ear 19, by the pressure exerted by the expanding limbs, is brought firmly into clamping engagement over the beveled edge of the mirror to the position shown in Figure 3.

The mirror thus is clamped firmly against the face flange 12 under controlled spring pressure, and at the same time the clip is locked securely against withdrawal by the positive engagement of the lugs within the locking slots. In this position there is practically no possibility of accidental displacement of the clips and the mirror is held firmly and reliably in position to withstand slamming of the door and other impacts without danger of dislodgement or breakage due to concentrated clamping stresses. In their final anchored positions, the connector portions 18 of the clips embrace the side flange 11 and overlie and conceal the apertures in which the clips are inserted thus presenting in assembly a neat, trim appearance.

Although the association of the clips with the door and mirror is a permanent one, the clips are capable of disengagement if breakage of the mirror or other reasons should require removal of the clips. For this purpose, the edges 24 of each aperture are provided with a small clearance recess 29 which permits a screw driver or similar tool to be inserted beneath the lower limb 21. By using the screw driver as a lever fulcrumed upon the recess, the lower limb 21 can be forced upwardly against the yielding pressure of the upper limb and disengaged from the locking lugs. It can then be withdrawn laterally from the aperture easily and later be reused after the damage has been repaired or the mirror replaced.

In the present disclosure the mirror backing is provided with a lip or flange 30 extending across its lower edge to support the weight load of the mirror panel. If desired, this flange may be omitted and the mirror supported upon clips applied to the lower flange in the same manner as the side clips.

The modified form of clip shown in Figure 9 is generally similar to the clips just described and differs primarily in that the connector portion 18, which is adapted to reside against the side flange of the mirror backing, extends at a somewhat acute angle from the lower limb 21 of the clip. By virtue of this arrangement, pressure at the heel 31 of the clip during its insertion causes the upper edge of the connector portion 18 to be sprung when it engages the side flange, until the recesses 26 are in engagement with the keys 25. This arrangement causes the edges of the key recesses 26 to bear outwardly under pressure against the keys, while limb 21 also bears downwardly toward the keys under the influence of limb 22. Therefore, frictional pressure for maintaining interlocking engagement is greater in this structure, with less possibility of inadvertent detachment. Such clips are effective for supporting mirrors of substantial weight and size, even though the clips themselves are small. Upon insertion of the clip of the type shown in Figure 9 into an aperture, the angular disposition of the connector portion 18 also causes the clip to become somewhat canted so that the upper limb 22 approaches or resides in parallelism with the underneath surface of the face flange 12 of the mirror backing. To facilitate removal the free extremity of limb 22 also may be curved downwardly toward limb 21.

By virtue of the construction of the clips as just described, it will be noticed that mirror engagement ears thereof are adapted to tolerate substantial variations in the thickness or bevelling configuration of the mirror glass and yet hold the glass firmly in position on the backing. In previous mirror clips of the type in which locking engagement is effected in a plane parallel to the plane of the mirror, difficulty frequently was encountered through mirrors becoming loose through variations in the thickness of commercial glass, and in addition the clips of the present invention are substantially easier and less costly to construct.

Having described my invention, I claim:

1. In combination with a mirror backing having a side flange for supporting a panel or the like, a mounting clip for clamping the panel upon the backing comprising, a pair of yieldable limbs diverging from one another in a plane, the side flange of the mirror backing having an aperture adapted to receive the diverging yieldable limbs, one of the said limbs having a connector portion extending laterally therefrom and adapted to reside against the side flange when the limbs are inserted into the aperture, the outer end of the said connector portion being bent in the plane of said diverging limbs to overlie a mirror panel seated upon the flange, said aperture having a key extending therein from an edge thereof, and one of said limbs having an aperture therein for locking engagement with said key upon insertion of the clip in said aperture.

2. In combination with a sheet metal mirror backing having a side flange and an angular marginal face flange for supporting a panel or the like, a mounting clip for clamping the panel under pressure against the face flange, said clip comprising, a pair of limbs yieldably diverging from one another in a plane, the side flange of the mirror backing having an aperture adapted to receive the diverging yieldable limbs, a connector portion extending laterally from one of the said limbs in a plane common to both of said limbs and adapted to reside against the side flange when the limbs are inserted into the aperture, the connector portion including an ear bent laterally from the extended end thereof and adapted to overlie a panel seated upon the face flange, the said yieldable limbs having a normal spacing greater than the depth of the aperture, whereby the limbs are compressed toward one another upon insertion thereof in the aperture, and thereby urge the said ear to press the mirror against the face flange of the mirror backing.

3. The combination of a mirror backing, a mirror residing facially over said backing, and a clip for securing the mirror to said backing, the said clip comprising, limbs yieldably diverging from one another in a plane of configuration, a connector extending laterally from the free end of one of said limbs across the free end of the other and terminating in an ear residing in the same plane of configuration as said limbs, adapted to overlie a facial portion of said mirror when the connector portion of said clip resides adjacent the edge of said mirror, a sidewise portion of said backing having an aperture therein for receiving the diverging limbs of said clip, means providing a detention key at said aperture, and one of the limbs of said clip having a recess for interlocking engagement with said detention key, the yieldable pressure of said limbs in the said plane of configuration providing a force for clamping the mirror between said ear and said backing and to maintain the engagement of said detention key with the recess in the limb of said clip.

4. A clip adapted to be inserted in a reception aperture of a sheet metal backing for clamping a mirror or the like to the backing, said clip comprising interconnected diverging limbs formed of spring metal and defining a yieldable wedge in cross section, one of said limbs having a connector portion extending laterally from a free end thereof, an ear adapted to overlie the edge of a mirror extending laterally from the free end of said connector portion with the said ear overlying the other of said limbs and residing in the same plane of configuration as said limbs, one of said limbs having a recess therein adapted for reception of a key provided on said mirror backing to interlock the clip with the backing when the clip is inserted in the aperture of the backing, the yieldable wedgelike relationship of said limbs providing a compressive force for clamping a mirror between said ear and said backing when the clip is inserted in the backing aperture.

5. A mirror mounting clip comprising an ear adapted to reside against the face of a mirror, a connector portion extending laterally from said ear and adapted to reside against the edge of the mirror, a yieldable limb extending laterally in the same direction as the ear from the end of the connector portion opposite the ear, said yieldable limb terminating in a reversely bent limb portion residing intermediate the first limb and the ear and residing in a plane which is common to said yieldable limb and to said bent limb portion, the said clip being adapted for use with a mirror backing having a portion extending laterally from the mirror to be supported, and adapted for insertion in an aperture in the laterally extending portion, the limbs of the said clip, upon compression, providing force for pressing the mirror between the ear and the mirror engaging surface of said backing, one of said limbs of said clip having a recess therein for reception of a locking key provided on said backing.

6. The combination of a backing, a panel and a clip for holding the panel to the backing, the backing having a panel engaging member and a member extending laterally thereto, the said laterally extending member having an aperture therein for receiving said clip, said clip comprising interconnected diverging limbs formed of spring metal, a connector portion extending laterally from the free end of one of said limbs across the free end of the other limb and terminating in an ear overlying said limbs and residing in a plane common to said limbs, the ear being adapted to overlie the face of the said panel with the connector portion residing adjacent the edge of said panel, the yieldable limbs being disposed within said aperture with one of the limbs bearing on the panel engaging member of said backing and urging the said ear to draw the panel to said backing through said connector portion, and means associated with said backing for locking the clip within the aperture.

7. The combination of a backing, a panel and a clip for holding the panel to the backing, the backing having a panel engaging member and a member extending laterally thereto, the said laterally extending member having an aperture therein for receiving said clip, said clip comprising interconnected diverging limbs formed of spring metal, a connector portion extending laterally from the free end of one of said limbs across the free end of the other and terminating in an ear overlying said limbs and adapted to overlie the face of the said panel with the connector portion residing adjacent the edge of said panel, the said ear and limbs all residing in a common plane of configuration, the yieldable limbs being disposed within said aperture with one of the limbs bearing on the panel supporting member of said backing and urging the said ear to draw the panel to said backing through said connector portion, one of the limbs of said clip having a recess therein, and the said backing having a key engageable with said recess upon insertion of the clip within said aperture to interlock the clip with the backing.

LOUIS FERLISE.

REFERENCES CITED

The following references are of record in the file of this patent:

UNITED STATES PATENTS

| Number | Name | Date |
|---|---|---|
| 1,966,505 | Keefe | July 17, 1934 |
| 2,129,189 | Alder | Sept. 6, 1938 |
| 2,184,893 | Lumley | Dec. 26, 1939 |
| 2,306,023 | Lumley | Dec. 22, 1942 |